United States Patent
Tang

(10) Patent No.: US 11,122,521 B2
(45) Date of Patent: Sep. 14, 2021

(54) METHOD FOR CONTROLLING RANDOM ACCESS POWER OF UE, UE AND COMPUTER STORAGE MEDIUM

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/912,610

(22) Filed: Jun. 25, 2020

(65) Prior Publication Data
US 2020/0329507 A1    Oct. 15, 2020

Related U.S. Application Data

(63) Continuation-in-part of application No. PCT/CN2017/118745, filed on Dec. 26, 2017.

(51) Int. Cl.
*H04W 52/32* (2009.01)
*H04W 52/36* (2009.01)
*H04W 74/08* (2009.01)
*H04W 52/28* (2009.01)
(Continued)

(52) U.S. Cl.
CPC ....... *H04W 52/282* (2013.01); *H04W 52/322* (2013.01); *H04W 52/36* (2013.01);
(Continued)

(58) Field of Classification Search
CPC ............ H04W 52/282; H04W 52/50; H04W 52/36; H04W 52/322; H04W 52/362; H04W 74/0833; H04W 52/146; H04W 52/28
See application file for complete search history.

(56) References Cited

U.S. PATENT DOCUMENTS

| 2008/0101306 A1 | 5/2008 | Bertrand et al. | |
| 2009/0305736 A1* | 12/2009 | Omori | H04W 52/50 455/522 |
| 2017/0048892 A1* | 2/2017 | Chen | H04W 52/18 |

FOREIGN PATENT DOCUMENTS

| CN | 1681222 A | 10/2005 |
| CN | 101350642 A | 1/2009 |

(Continued)

OTHER PUBLICATIONS

International Search Report in the International Application No. PCT/CN2017/118745, dated Aug. 29, 2018.
Written Opinion of the International Search Authority in International Application No. PCT/CN2017/118745, dated Aug. 29, 2018 with English translation provided by Google Translate.

(Continued)

*Primary Examiner* — Moo Jeong
(74) *Attorney, Agent, or Firm* — Ladas & Parry, LLP

(57) ABSTRACT

A method for controlling random access power of a user equipment (UE), a UE, and a computer storage medium. The method includes: receiving system broadcast information sent from a network side; obtaining a scaling factor corresponding to a speed of the UE from the system broadcast information, wherein the scaling factor corresponding to the speed of the UE comprises at least one of the following: a power adjustment parameter for the UE to perform random access, an adjustment parameter for a power ramp step, or an adjustment parameter for a random access fallback; and correcting a power in a random access procedure of the UE and a time for transmitting a preamble in the random access procedure based on the scaling factor corresponding to the speed of the UE.

16 Claims, 1 Drawing Sheet

(51) Int. Cl.
*H04W 52/50* (2009.01)
*H04W 52/14* (2009.01)
(52) U.S. Cl.
CPC ......... *H04W 52/362* (2013.01); *H04W 52/50* (2013.01); *H04W 74/0833* (2013.01)

(56) References Cited

FOREIGN PATENT DOCUMENTS

| CN | 101572940 A | 11/2009 | | |
|---|---|---|---|---|
| CN | 102647775 A | 8/2012 | | |
| EP | 2131621 A1 | 12/2009 | | |
| WO | 0033478 A1 | 6/2000 | | |
| WO | WO-2018175809 A1 | * | 9/2018 | ........ H04W 74/0833 |
| WO | 2019/127044 A1 | 7/2019 | | |

OTHER PUBLICATIONS

3GPP TS 36.321 V14.4.0 (Sep. 2017); 3rd Generation Partnership Project;Technical Specification Group Radio Access Network;Evolved Universal Terrestrial Radio Access (E-UTRA);Medium Access Control (MAC) protocol specification (Release 14).

The EESR of corresponding European application No. 17936471.6, dated Nov. 17, 2020.

"3rd Generation Partnership Project; Technical Specification Group Radio Access Network; Radio Resource Control (RRC) protocol specification (Release 1999)", 3GPP Standard; 3GPP TS 25.331, 3rd Generation Partnership Project(3GPP), Mobile Competence Centre; 650, Route Des Lucioles; F-06921 Sophia-Antipolis Cedex; France, No. V3.20.0, Jun. 22, 2004(Jun. 22, 2004), pp. 1-879, XP050367924.

The first Office Action of corresponding European application No. 17936471.6, dated May 12, 2021.

CATT: "RACH power control and power ramping procedure", 3GPP Draft; R1-17111617_RACH_Power_Control (Revision of R1-1710034), 3rd Generation Partnership Project (3GPP), Mobile Competence Centre; 650, Route Des Lucioles; F-06921 Sophia-Antipolis Cedex; FRA, vol. RAN WG1, No. Qingdao, China; Jun. 27, 2017-Jun. 30, 2017 Jun. 26, 2017(Jun. 26, 2017), XP051300787.

* cited by examiner

METHOD FOR CONTROLLING RANDOM ACCESS POWER OF UE, UE AND COMPUTER STORAGE MEDIUM

CROSS-REFERENCE TO RELATED APPLICATION

This application is a continuation of International Application No. PCT/CN2017/118745, filed on Dec. 26, 2017, the entire content of which is incorporated herein by reference in its entirety.

TECHNICAL FIELD

The present disclosure relates to the field of information processing technologies, and, in particular, to a method for controlling random access power of a user equipment (UE), a UE, and a computer storage medium.

BACKGROUND

Currently, system broadcast information in New Radio (NR) is categorized into minimum system information (MSI) and other system information (OSI), where the OSI can be issued by a network side based on a request from a UE, instead of periodic broadcasting which is taken conventionally. For a request from the UE, the network side may be indicated of a request for the OSI through MSG1 or MSG3 in a random access procedure.

For a UE with a high moving speed, it is necessary to obtain the OSI as soon as possible to meet a mobility requirement in an idle state in order for the UE to select a neighbor cell quickly. In a handover scenario, a UE with a high moving speed also needs to perform the handover quickly to meet a performance requirement of handover. Therefore, it is necessary for a high-speed UE to shorten the time of random access.

SUMMARY

To solve the above technical problem, embodiments of the present disclosure provide a method for controlling random access power of a UE, a UE, and a computer storage medium.

An embodiment of the present disclosure provides a method for controlling random access power of a UE, which is applied to the UE. The method includes:

receiving system broadcast information sent from a network side;

obtaining, from the system broadcast information, a scaling factor corresponding to a speed of the UE, wherein the scaling factor corresponding to the speed of the UE includes at least one of the following: a power adjustment parameter for the UE to perform random access, an adjustment parameter for a power ramp step, or an adjustment parameter for a random access fallback; and correcting, based on the scaling factor corresponding to the speed of the UE, a power in a random access procedure of the UE and a time for transmitting a preamble in the random access procedure.

An embodiment of the present disclosure provides a UE, including:

a communicating unit that receives system broadcast information sent from a network side;

a processing unit that obtains, from the system broadcast information, a scaling factor corresponding to a speed of the UE, wherein the scaling factor corresponding to the speed of the UE includes at least one of the following: a power adjustment parameter for the UE to perform random access, an adjustment parameter for a power ramp step, or an adjustment parameter for a random access fallback; and corrects, based on the scaling factor corresponding to the speed of the UE, a power in a random access procedure of the UE and a time for transmitting a preamble in the random access procedure.

An embodiment of the present disclosure provides a UE, including a processor and a memory for storing a computer program which is runnable on the processor, wherein the processor is configured to implement steps of the foregoing method when running the computer program.

An embodiment of the present disclosure provides a computer storage medium, wherein the computer storage medium stores computer executable instructions, and steps of the foregoing method are implemented when the computer executable instructions are executed.

According to a technical solution of embodiments of the present disclosure, a corresponding scaling factor can be determined based on the speed of a UE, and then at least one of a power adjustment parameter for the UE to perform random access, an adjustment parameter for a power ramp step, or an adjustment parameter for a random access fallback in the corresponding scaling factor is used to perform random access processing. In this way, the random access procedure can be combined with the speed of the UE, thereby adjusting the speed of the random access procedure, achieving fast access to a network, and improving mobile robustness.

DESCRIPTION OF EMBODIMENTS

For a thorough understanding of the features and technical contents of the embodiments of the present disclosure, implementation of the embodiments of the present disclosure will be described in detail below with reference to the accompanying drawings. The accompanying drawings are for reference only and are not intended to limit the embodiments of the present disclosure.

First Embodiment

Figure 1:
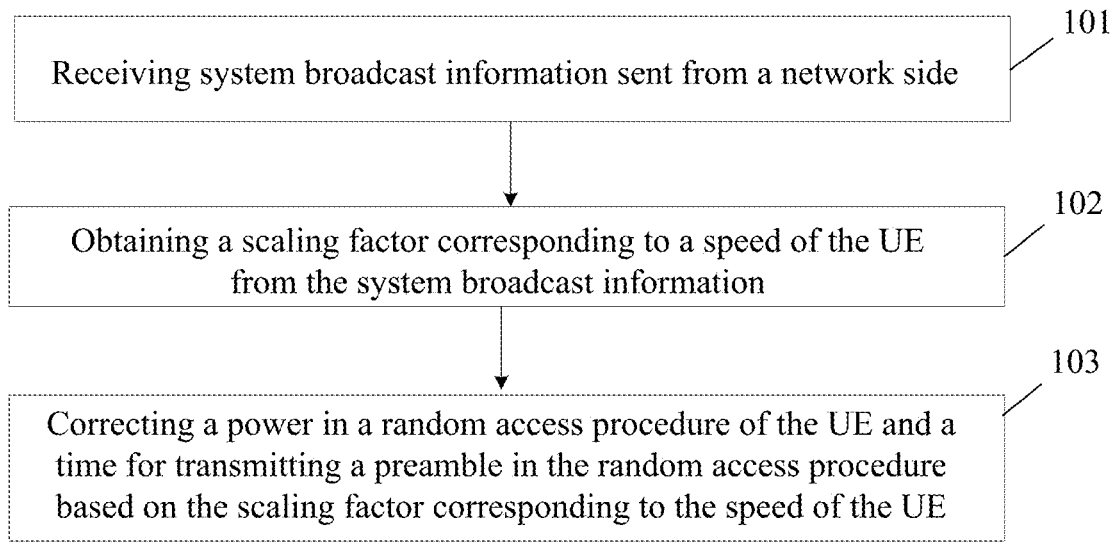
FIG. 1 is a schematic flowchart of a method for controlling random access power of a UE according to an embodiment of the present disclosure.

This embodiment of the present disclosure provides a method for controlling random access power of a UE, which is applied to the UE. As shown in FIG. 1, the method includes:

Step 101: receiving system broadcast information sent from a network side;

Step 102: obtaining a scaling factor corresponding to a speed of the UE from the system broadcast information, wherein the scaling factor corresponding to the speed of the UE includes at least one of the following: a power adjustment parameter for the UE to perform random access, an adjustment parameter for a power ramp step, or an adjustment parameter for a random access fallback; and Step 103: correcting a power in a random access procedure of the UE and a time for transmitting a preamble in the random access procedure, based on the scaling factor corresponding to the speed of the UE.

At first, the UE may receive information sent by the network side, which may specifically include: the network side broadcasts, via a system broadcast, and a scaling factor which is based on the speed of the UE.

The power adjustment parameter for the UE to perform random access includes a factor or offset for a target receive power of an initially transmitted preamble, for the UE to perform the random access.

The adjustment parameter for the power ramp step includes a factor or offset for the power ramp step when the UE performs the random access.

The adjustment parameter for the random access fallback includes a factor or offset for the random access fallback.

Specifically, the scaling factor includes at least one of the following: a factor or offset for a target receive power of an initially transmitted preamble PREAMBLE of the UE for the random access, a factor or offset for the power ramp step of the random access, or a factor or offset for the random access fallback.

It can also be understood that the network side can issue a series of scaling factors, that is, different scaling factors corresponding to a plurality of UE speeds, or to a plurality of UE speed ranges, and then the UE can select a corresponding scaling factor as a scaling factor for correction of this random access according to a current moving speed of itself, which is as follows.

The obtaining a scaling factor corresponding to a speed of the UE includes:

determining, by the UE, a speed range corresponding to the UE based on a moving speed; and selecting a corresponding scaling factor based on the speed range corresponding to the UE.

Here, the speed of the UE may be a relative value, or an absolute value or range of the speed of the UE, which corresponds to a scaling factor or offset. As an example, a relative speed, for instance, normal, medium-speed, or high-speed moving status of the UE, corresponds to a scaling factor or offset, respectively. The UE judges which speed level it is and then determines the factor. An absolute speed range, for example, from a km/h to b km/h, corresponds to a scaling factor or offset. The UE determines which scaling factor or offset to use according to its actual speed.

How to use the various parameters of the foregoing scaling factors will be explained in the following in detail.

First: correction of the target receive power of the initially transmitted preamble.

The correcting a power in a random access procedure of the UE based on the scaling factor corresponding to the speed of the UE includes:

obtaining a corrected target receive power of the initially transmitted preamble based on multiplication of the target receive power of the initially transmitted preamble for the UE to perform the random access and the factor for the target receive power of the initially transmitted preamble for the UE to perform the random access; or obtaining the corrected target receive power of the initially transmitted preamble based on addition of the target receive power of the initially transmitted preamble for the UE to perform the random access and the offset for the target receive power of the initially transmitted preamble for the UE to perform the random access.

In other words, during the random access procedure, the UE corrects the target receive power of the initially transmitted preamble of the UE for the random access, and the target receive power of the initially transmitted PREAMBLE of the UE for the random access is corrected by: multiplying the target receive power of the initially transmitted PREAMBLE of the UE for the random access that is broadcasted in system broadcast by the factor for the target receive power of the initially transmitted PREAMBLE of the UE for the random access, or adding the target receive power of the initially transmitted PREAMBLE of the UE for the random access that is broadcasted in the system broadcast and the offset for the target receive power of the initially transmitted PREAMBLE of the UE for the random access.

Second: correction of the power ramp step when the UE performs the random access.

The correcting a power in a random access procedure of the UE based on the scaling factor corresponding to the speed of the UE includes:

obtaining a corrected power ramp step when the UE performs the random access, based on multiplication of the power ramp step when the UE performs the random access and the factor for the power ramp step when the UE performs the random access; or obtaining the corrected power ramp step when the UE performs the random access, based on addition of the power ramp step when the UE performs the random access and the offset for the power ramp step when the UE performs the random access.

Here, the power ramp step can be understood as the UE correcting the power ramp step for the random access during the random access procedure. Correspondingly, during the random access procedure, the UE corrects the power ramp step for the random access, and the power ramp step for the random access is corrected by: multiplying the power ramp step for the random access that is broadcasted in system broadcast by the factor for the power ramp step of the random access, or adding the power ramp step for the random access that is broadcasted in the system broadcast and the offset for the power ramp step of the random access.

Third: correction of a value for the random access fallback.

This correction process may include two manners. The first manner is: obtaining a corrected reference value for the random access fallback based on multiplication of a random access fallback indicated by the network side and the factor for the random access fallback; or obtaining the corrected reference value for the random access fallback based on addition of the random access fallback indicated by the network side and the offset for the random access fallback; and generating a corrected value for the random access fallback according to the corrected reference value for the random access fallback, where the corrected value for the random access fallback is greater than zero and smaller than the corrected reference value for the random access fallback.

In other words, the UE corrects the random access fallback during the random access procedure. The reference value for the random access fallback is: a product of a random access fallback indicated in a random access response (RAR) and the factor for the random access fallback, or a sum of the random access fallback indicated in RAR and the offset for the random access fallback.

Then, a value for the random access fallback between zero and the corrected reference value for the random access fallback is randomly generated according to the corrected reference value for the random access fallback.

The second manner is:

obtaining a corrected random access fallback based on multiplication of a random access fallback that is randomly generated and the factor for the random access fallback; or obtaining the corrected random access fallback based on addition of the random access fallback that is randomly generated and the offset for the random access fallback.

The difference from the first manner is that this manner calculates and obtains the random access fallback directly, that is, the UE corrects the random access fallback during the random access procedure, and the random access fallback is corrected by: multiplying the random access fallback that is randomly generated by the factor for the random access fallback, or adding the random access fallback that is randomly generated and the offset for the random access fallback.

Based on the previous introduction, the corrected target receive power of the initially transmitted preamble, the corrected power ramp step when the UE performs the random access and the corrected random access fallback can be obtained, which can be used to perform a transmitting process of the preamble for the random access, specifically:

a transmit power of the preamble is determined based on at least one of the corrected target receive power of the initially transmitted preamble or the corrected power ramp step when the UE performs the random access; and the time for transmitting the preamble is determined based on the corrected random access fallback.

That is, the transmit power of the preamble can be obtained based on addition of the corrected target receive power of the preamble and the corrected power ramp step when the UE performs the random access. Of course, there may be other processing manners, which will not be detailed herein.

It can be seen that by using the above scheme, a corresponding scaling factor can be determined based on the speed of a UE, and then at least one of a power adjustment parameter for the UE to perform random access, an adjustment parameter for a power ramp step, or an adjustment parameter for a random access fallback in the corresponding scaling factor is used to perform a random access processing. In this way, the random access procedure can be combined with the speed of the UE, thereby adjusting the speed of the random access procedure, achieving fast access to a network, and improving mobile robustness.

Second Embodiment

Figure 2:
FIG. 2 is a schematic structural diagram of a user equipment according to an embodiment of the present disclosure.

An embodiment of the present disclosure provides a UE. As shown in FIG. 2, the UE includes:

a communicating unit 21 that receives system broadcast information sent from a network side;

a processing unit 22 that obtains a scaling factor corresponding to a speed of the UE from the system broadcast information, wherein the scaling factor corresponding to the speed of the UE includes at least one of the following: a power adjustment parameter for the UE to perform random access, an adjustment parameter for a power ramp step, or an adjustment parameter for a random access fallback; and corrects a power in a random access procedure of the UE and a time for transmitting a preamble in the random access procedure based on the scaling factor corresponding to the speed of the UE.

At first, the UE may receive information sent by the network side, which may specifically include: the network side broadcasts, via a system broadcast, and a scaling factor which is based on the speed of the UE.

The power adjustment parameter for the UE to perform random access includes a factor or offset for a target receive power of an initially transmitted preamble, for the UE to perform the random access.

The adjustment parameter for the power ramp step includes a factor or offset for the power ramp step when the UE performs the random access.

The adjustment parameter for the random access fallback includes a factor or offset for the random access fallback.

Specifically, the scaling factor includes at least one of the following: a factor or offset for a target receive power of an initially transmitted preamble PREAMBLE of the UE for the random access, a factor or offset for the power ramp step of the random access, or a factor or offset for the random access fallback.

It can also be understood that the network side can issue a series of scaling factors, that is, different scaling factors corresponding to a plurality of UE speeds, or to a plurality of UE speed ranges, and then the UE can select a corresponding scaling factor as a scaling factor for correction of this random access according to a current moving speed of itself, which is as follows:

the processing unit 22 determines a speed range corresponding to the UE based on a moving speed; and selects a corresponding scaling factor based on the speed range corresponding to the UE.

Here, the speed of the UE may be a relative value, or an absolute value or range of the speed of the UE, which corresponds to a scaling factor or offset. As an example, a relative speed, for instance, normal, medium speed, or high speed moving status of the UE, corresponds to a scaling factor or offset, respectively. The UE judges which speed level it is and determines the factor. An absolute speed range, for example, from a km/h to b km/h, corresponds to a scaling factor or offset. The UE determines which scaling factor or offset to use according to its actual speed.

How to use the various parameters of the foregoing scaling factors will be explained in the following in detail:

First: correction of the target receive power of the initially transmitted preamble.

The processing unit 22 obtains a corrected target receive power of the initially transmitted preamble based on multiplication of the target receive power of the initially transmitted preamble for the UE to perform the random access and the factor for the target receive power of the initially transmitted preamble for the UE to perform the random access; or obtains the corrected target receive power of the initially transmitted preamble based on addition of the target receive power of the initially transmitted preamble for the UE to perform the random access and the offset for the target receive power of the initially transmitted preamble for the UE to perform the random access.

In other words, during the random access procedure, the UE corrects the target receive power of the initially transmitted preamble of the UE for the random access, and the target receive power of the initially transmitted PREAMBLE of the UE for the random access is corrected by: multiplying the target receive power of the initially transmitted PREAMBLE of the UE for the random access that is broadcasted in system broadcast by the factor for the target receive power of the initially transmitted PREAMBLE of the UE for the random access, or adding the target receive power of the initially transmitted PREAMBLE of the UE for the random access that is broadcasted in the system broadcast and the offset for the target receive power of the initially transmitted PREAMBLE of the UE for the random access.

Second: correction of the power ramp step when the UE performs the random access.

The processing unit 22 obtains a corrected power ramp step when the UE performs the random access, based on multiplication of the power ramp step when the UE performs the random access and the factor for the power ramp step when the UE performs the random access; or obtains the corrected power ramp step when the UE performs the random access based on addition of the power ramp step when the UE performs the random access and the offset for the power ramp step when the UE performs the random access.

Here, the power ramp step can be understood as the UE correcting the power ramp step for the random access during the random access procedure. Correspondingly, during the random access procedure, the UE corrects the power ramp step for the random access, and the power ramp step for the random access is corrected by: multiplying the power ramp step for the random access that is broadcasted in system broadcast by the factor for the power ramp step of the random access, or adding the power ramp step for the random access that is broadcasted in the system broadcast and the offset for the power ramp step of the random access.

Third: correction of a value for the random access fallback.

This correction process may include two manners. The first manner is: the processing unit 22 obtains a corrected reference value for the random access fallback based on multiplication of a random access fallback indicated by the network side and the factor for the random access fallback; or obtains a corrected reference value for the random access fallback based on addition of the random access fallback indicated by the network side and the offset for the random access fallback; and generates a corrected value for the random access fallback according to the corrected reference value for the random access fallback, where the corrected value for the random access fallback is greater than zero and smaller than the corrected reference value for the random access fallback.

In other words, the UE corrects the random access fallback during the random access procedure. The reference value for the random access fallback is: a product of a random access fallback indicated in an RAR and the factor for the random access fallback, or a sum of the random access fallback indicated in the RAR and the offset for the random access fallback.

Then, a value for the random access fallback between zero and the corrected reference value for the random access fallback is randomly generated according to the corrected reference value for the random access fallback.

The second manner is:

the processing unit 22 obtains a corrected random access fallback based on multiplication of a random access fallback that is randomly generated and the factor for the random access fallback; or obtains the corrected random access fallback based on addition of the random access fallback that is randomly generated and the offset for the random access fallback.

The difference from the first manner is that this manner calculates and obtains the random access fallback directly, that is, the UE corrects the random access fallback during the random access procedure, and the random access fallback is corrected by: multiplying the random access fallback that is randomly generated and the factor for the random access fallback, or adding the random access fallback that is randomly generated and the offset for the random access fallback.

Based on the previous introduction, the corrected target receive power of the initially transmitted preamble, the corrected power ramp step when the UE performs the random access and the corrected random access fallback can be obtained, which can be used to perform a transmitting process of the preamble for the random access, specifically:

the processing unit 22 determines a transmit power of the preamble based on at least one of the corrected target receive power of the initially transmitted preamble or the corrected power ramp step when the UE performs the random access; and determines the time for transmitting the preamble based on the corrected random access fallback.

That is, the transmit power of the preamble can be obtained based on addition of the corrected target receive power of the preamble and the corrected power ramp step when the UE performs the random access. Of course, there may be other processing manners, which will not be detailed herein.

It can be seen that by using the above scheme, a corresponding scaling factor can be determined based on the speed of a UE, and then at least one of a power adjustment parameter for the UE to perform random access, an adjustment parameter for a power ramp step, or an adjustment parameter for a random access fallback in the corresponding scaling factor is used to perform a random access procedure. In this way, the random access procedure can be combined with the speed of the UE, thereby adjusting the speed of the random access procedure, achieving fast access to a network, and improving mobile robustness.

Figure 3:
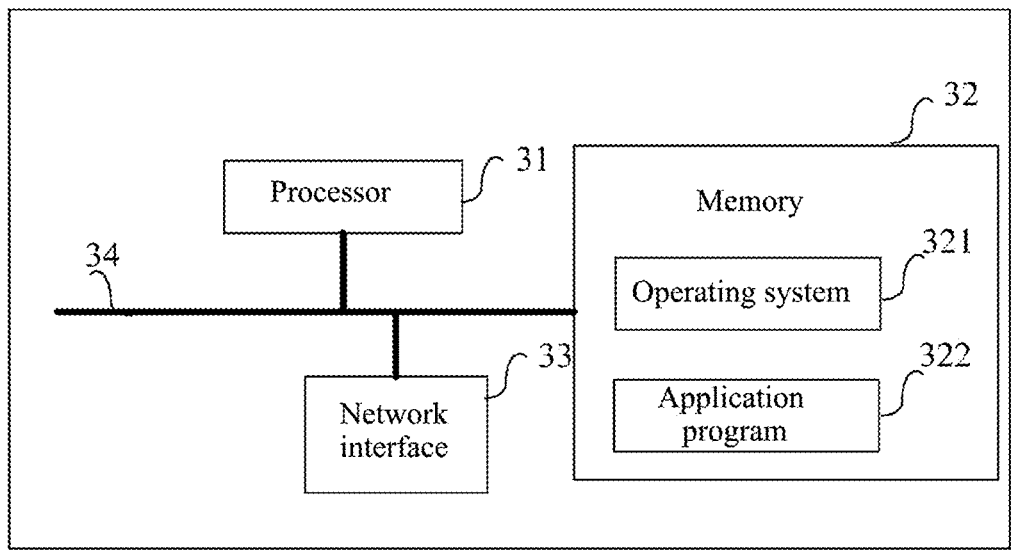
FIG. 3 is a schematic diagram of hardware architecture according to an embodiment of the present disclosure.

An embodiment of the present disclosure further provides a hardware component architecture of a user equipment, as shown in FIG. 3, including at least one processor 31, a memory 32, and at least one network interface 33. The various components are coupled together via a bus system 34. It can be understood that the bus system 34 is used to implement connection and communication among these components. The bus system 34 includes a power bus, a control bus, and a status signal bus in addition to the data bus. However, for the sake of clarity, various buses are marked as the bus system 34 in FIG. 3.

It can be understood that the memory 32 in the embodiment of the present disclosure may be a volatile memory or a non-volatile memory, or may include both volatile and non-volatile memory.

In some implementations, the memory 32 stores the following elements, executable modules or data structures, or a subset of them, or an extended set of them:

an operating system 321 and an application program 322.

The processor 31 is configured to be capable of processing steps of the method according to the foregoing first embodiment, and details are not described herein again.

An embodiment of the present disclosure provides a computer storage medium. The computer storage medium stores computer executable instructions, wherein steps of the method according to the foregoing first embodiment are implemented when the computer executable instructions are executed.

The above device according to the embodiment of the present disclosure may also be stored in a computer readable storage medium if the device is implemented in the form of a software functional module and sold or used as an independent product. Based on such an understanding, the technical solutions of the embodiments of the present disclosure in nature or the part that contributes to the prior art can be embodied in the form of a software product, where such computer software product is stored in a storage medium and includes several instructions to enable a computer device (which may be a personal computer, a server, or a network device) to perform all or part of the methods described in the embodiments of the present disclosure. The foregoing storage medium includes various media that can store program codes, such as a U disk, a mobile hard disk, a read only memory (ROM), a magnetic disk, or an optical disk. Therefore, the embodiments of the present disclosure are not limited to any specific combination of hardware and software.

Accordingly, an embodiment of the present disclosure further provides a computer storage medium in which a computer program is stored, and the computer program is configured to execute the method of the embodiment of the present disclosure.

Although preferred embodiments of the present disclosure have been disclosed for illustrative purposes, those skilled in the art will recognize that there may be various modifications, additions, and substitutions, and therefore, the scope of the present disclosure should not be limited to the above embodiments.

The invention claimed is:

1. A method for controlling random access power of a user equipment (UE), which is applied to the UE, wherein the method comprises:
receiving system broadcast information sent from a network side;
obtaining, from the system broadcast information, a scaling factor corresponding to a speed of the UE, wherein the scaling factor corresponding to the speed of the UE comprises at least one of the following: a power adjustment parameter for the UE to perform random access, an adjustment parameter for a power ramp step, or an adjustment parameter for a random access fallback, wherein the power adjustment parameter for the UE to perform random access comprises a factor or offset for a target receive power of an initially transmitted preamble for the UE to perform the random access, the adjustment parameter for the power ramp step comprises a factor or offset for the power ramp step when the UE performs the random access, and the adjustment parameter for the random access fallback comprises a factor or offset for the random access fallback; and
correcting, based on the scaling factor corresponding to the speed of the UE, a power in a random access procedure of the UE and a time for transmitting a preamble in the random access procedure;
wherein the method further comprises:
obtaining a corrected reference value for the random access fallback based on multiplication of a random access fallback indicated by the network side and the factor for the random access fallback; or obtaining the corrected reference value for the random access fallback based on addition of the random access fallback indicated by the network side and the offset for the random access fallback; and
generating a corrected value for the random access fallback according to the corrected reference value for the random access fallback, wherein the corrected value for the random access fallback is greater than zero and smaller than the corrected reference value for the random access fallback.

2. The method according to claim 1, wherein the obtaining a scaling factor corresponding to a speed of the UE comprises:
determining, by the UE, a speed range corresponding to the UE based on a moving speed; and
selecting, based on the speed range corresponding to the UE, a corresponding scaling factor.

3. The method according to claim 1, wherein the correcting, based on the scaling factor corresponding to the speed of the UE, a power in a random access procedure of the UE, comprises:
obtaining a corrected target receive power of the initially transmitted preamble based on multiplication of the target receive power of the initially transmitted preamble for the UE to perform the random access and the factor for the target receive power of the initially transmitted preamble for the UE to perform the random access.

4. The method according to claim 1, wherein the correcting, based on the scaling factor corresponding to the speed of the UE, a power in a random access procedure of the UE, comprises:
obtaining a corrected target receive power of the initially transmitted preamble based on addition of the target receive power of the initially transmitted preamble for the UE to perform the random access and the offset for the target receive power of the initially transmitted preamble for the UE to perform the random access.

5. The method according to claim 1, wherein the correcting, based on the scaling factor corresponding to the speed of the UE, a power in a random access procedure of the UE, comprises:
obtaining a corrected power ramp step when the UE performs the random access based on multiplication of the power ramp step when the UE performs the random access and the factor for the power ramp step when the UE performs the random access.

6. The method according to claim 1, wherein the correcting, based on the scaling factor corresponding to the speed of the UE, a power in a random access procedure of the UE, comprises:
obtaining a corrected power ramp step when the UE performs the random access based on addition of the power ramp step when the UE performs the random access and the offset for the power ramp step when the UE performs the random access.

7. The method according to claim 1, wherein the correcting a power in a random access procedure of the UE and a time for transmitting a preamble in the random access procedure comprises:
determining a transmit power of the preamble based on at least one of a corrected target receive power of an initially transmitted preamble or a corrected power ramp step when the UE performs the random access; and
determining the time for transmitting the preamble based on a corrected random access fallback.

8. A non-transitory computer-readable storage medium, wherein the computer-readable storage medium stores computer executable instructions, and steps of the method according to claim 1 are implemented when the computer executable instructions are executed.

9. A user equipment (UE), comprising a processor, a network interface, and a memory for storing a computer program which is runnable on the processor, wherein the processor is configured to:
control the network interface to receive system broadcast information sent from a network side;
obtain a scaling factor corresponding to a speed of the UE from the system broadcast information, wherein the scaling factor corresponding to the speed of the UE comprises at least one of the following: a power adjustment parameter for the UE to perform random access, an adjustment parameter for a power ramp step, or an adjustment parameter for a random access fallback, wherein the power adjustment parameter for the UE to perform random access comprises a factor or offset for a target receive power of an initially transmitted preamble for the UE to perform the random access, the adjustment parameter for the power ramp step comprises a factor or offset for the power ramp step when the UE performs the random access, and the adjustment parameter for the random access fallback comprises a factor or offset for the random access fallback; and correct a power in a random access procedure of the UE and a time for transmitting a preamble in the random access procedure based on the scaling factor corresponding to the speed of the UE;

wherein the processor is further configured to obtain a corrected random access fallback based on multiplication of a random access fallback that is randomly generated and the factor for the random access fallback; or obtain the corrected random access fallback based on addition of the random access fallback that is randomly generated and the offset for the random access fallback.

10. The UE according to claim 9, wherein the processor is further configured to: determine a speed range corresponding to the UE based on a moving speed; and select a corresponding scaling factor based on the speed range corresponding to the UE.

11. The UE according to claim 9, wherein the processor is further configured to obtain a corrected target receive power of the initially transmitted preamble based on multiplication of the target receive power of the initially transmitted preamble for the UE to perform the random access and the factor for the target receive power of the initially transmitted preamble for the UE to perform the random access.

12. The UE according to claim 9, wherein the processor is further configured to obtain a corrected target receive power of the initially transmitted preamble based on addition of the target receive power of the initially transmitted preamble for the UE to perform the random access and the offset for the target receive power of the initially transmitted preamble for the UE to perform the random access.

13. The UE according to claim 9, wherein the processor is further configured to obtain a corrected power ramp step when the UE performs the random access based on multiplication of the power ramp step when the UE performs the random access and the factor for the power ramp step when the UE performs the random access.

14. The UE according to claim 9, wherein the processor is further configured to obtain a corrected power ramp step when the UE performs the random access based on addition of the power ramp step when the UE performs the random access and the offset for the power ramp step when the UE performs the random access.

15. The UE according to claim 9, wherein the processor is further configured to:

determine a transmit power of the preamble based on at least one of a corrected target receive power of an initially transmitted preamble or a corrected power ramp step when the UE performs the random access; and determine the time for transmitting the preamble based on a corrected random access fallback.

16. A user equipment (UE), comprising a processor, a network interface, and a memory for storing a computer program which is runnable on the processor, wherein the processor is configured to:

control the network interface to receive system broadcast information sent from a network side;

obtain a scaling factor corresponding to a speed of the UE from the system broadcast information, wherein the scaling factor corresponding to the speed of the UE comprises at least one of the following: a power adjustment parameter for the UE to perform random access, an adjustment parameter for a power ramp step, or an adjustment parameter for a random access fallback, wherein the power adjustment parameter for the UE to perform random access comprises a factor or offset for a target receive power of an initially transmitted preamble for the UE to perform the random access, the adjustment parameter for the power ramp step comprises a factor or offset for the power ramp step when the UE performs the random access, and the adjustment parameter for the random access fallback comprises a factor or offset for the random access fallback; and correct a power in a random access procedure of the UE and a time for transmitting a preamble in the random access procedure based on the scaling factor corresponding to the speed of the UE;

wherein the processor is further configured to:

obtain a corrected reference value for the random access fallback based on multiplication of a random access fallback indicated by the network side and the factor for the random access fallback; or obtain the corrected reference value for the random access fallback based on addition of the random access fallback indicated by the network side and the offset for the random access fallback; and generate a corrected value for the random access fallback according to the corrected reference value for the random access fallback, wherein the corrected value for the random access fallback is greater than zero and smaller than the corrected reference value for the random access fallback.

\* \* \* \* \*